(No Model.)

J. A. McLAUGHLIN.
VEHICLE AXLE.

No. 596,532.   Patented Jan. 4, 1898.

WITNESSES:
Otis D. Swett.
C. H. Childs.

INVENTOR
James A. McLaughlin.
BY
Chas D. Smith,
ATTORNEY.

UNITED STATES PATENT OFFICE.

JAMES A. McLAUGHLIN, OF JESSUP, GEORGIA.

VEHICLE-AXLE.

SPECIFICATION forming part of Letters Patent No. 596,532, dated January 4, 1898.

Application filed April 28, 1897. Serial No. 634,250. (No model.)

*To all whom it may concern:*

Be it known that I, JAMES A. McLAUGHLIN, a citizen of the United States, residing at Jessup, in the county of Wayne and State of Georgia, have invented certain new and useful Improvements in Vehicle-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates more especially to vehicle-axles, but may be applied to gear of other forms. The objects attained by it are, first, to provide removable bearings; second, to reduce friction; third, to prevent lost motion, and, fourth, to secure automatic lubrication. The means by which these objects are attained are fully illustrated in the accompanying drawings, in which—

Figure 1:
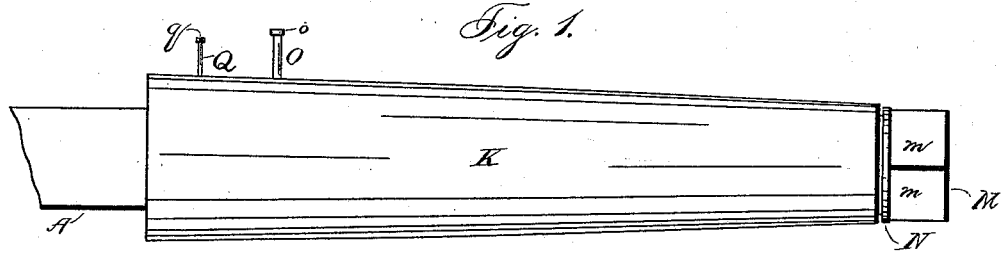
Figure 2:
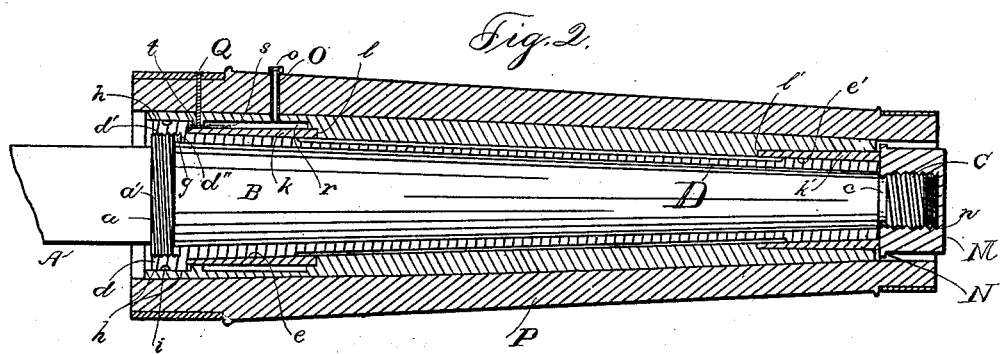

Figure 1 is an exterior longitudinal view of the invention. Fig. 2 is a longitudinal view, the hub and parts of the invention appearing in vertical section.

Like letters denote corresponding parts in both views.

The letter A indicates a portion of the body of a vehicle-axle. It has a collar $a$ formed upon it at the base of the spindle. The collar has a peripheral thread $a'$.

B indicates the spindle, tapering slightly toward the point. It is provided with a threaded end C and the annular recess $c$ next to the terminal thread.

D indicates a slightly-flaring thimble or sleeve adapted to be moved longitudinally upon and to fit closely to the spindle B. It has an abruptly-enlarged end $d$, provided with an inner thread $d'$ to engage the thread on collar $a$. A space $g$ is provided between the outer edge of the collar $a$ and the shoulder $d''$ of the sleeve. This space $g$ allows the sleeve to "creep" as it expands by heat and wear, its movement being taken up automatically on the threads of collar $a$. The threads are all cut so as to tighten with the normal motion of the parts affected.

A dust-guard is provided by annular ribs $h\ h$ and the interlying groove $i$ on the collar $a$, which are covered normally by the overlapping end of the box K.

K indicates the hub-box. It is provided with bush-seats $l\ l'$, into which are fitted removable bushings $k\ k'$. These bushings project slightly beyond the parts of the box to which they are fitted. In operative position the interior surfaces of these bushings bear upon the outer elevated surfaces $e\ e'$ of the sleeve.

A tubular nut M, having the wrench-seat $m\ m$ and internally threaded, is screwed upon the threaded end C of the spindle. A flange N at the edge of this nut bears against the projecting edge of the bushing in box K. To allow of adjustment, washers $n\ n$ are supplied in the bottom of the nut, so that as the edge of the bushing $k'$ wears off or as the sleeve creeps away a washer is removed and the nut is set up tightly against the end of the spindle and thus prevents looseness and consequent wabbling. By this construction all the wear of the box falls upon the removable bushings $k\ k'$, both at their surfaces and edges, and no wear is possible to the spindle, as only its removable sleeve is in contact with the box. When the sleeve is worn out, a new one is easily and cheaply supplied, and when the bushings in the box are worn they are easily knocked out and others substituted.

O is an oil-tube which passes through the hub P and the box K and communicates with the oil-chamber $r$, formed within the box and covered by the bushing $k$. It has a tight cap $o$, of any preferred kind.

Q is a threaded set-screw having a head-kerf $q$ and which also extends through the hub and box and terminates against the wick $s$ in the oil-duct $t$, by means of which, with a screw-driver, the flow of oil is regulated from without. The duct $t$ extends along the box side under the bushing from the chamber $r$ to the inner end of the box. The wick $t$, with one end in the oil of the chamber, lies in the duct and conveys the oil by capillary attraction to its other end at the outer edge of the bush $k$, whence it is distributed to all the bearings.

There may be a reasonable variation in the form, proportion, or relative position of the parts of this invention from those shown in the drawings without departing from the spirit of the invention.

What I claim, and desire to secure by Letters Patent, is—

1. In a vehicle-axle a threaded collar at the base of a tapering spindle, a flaring sleeve fitted upon said spindle having an abruptly-enlarged threaded end forming exterior and interior shoulders and adapted to engage the said threaded collar when turned over toward the front of the vehicle, and a space reserved between the outer edge of said collar and the contiguous interior shoulder of the sleeve to allow automatic adjustment of said sleeve as described.

2. In a vehicle-axle an adjustable sleeve having annular bearing elevations and an intermediate oil-seat, a hub-box with removable bushings bearing superficially upon said elevations, and each with an edge projecting beyond the ends of the hub-box the projecting edge of one bush bearing against the exterior shoulder of the sleeve, and that of the other against a terminal axle-nut as herein set forth.

3. In a vehicle-axle a threaded collar at the base of a tapering spindle, a flaring sleeve fitted upon said spindle having an abruptly-enlarged threaded end forming exterior and interior shoulders and adapted to engage the said threaded collar, a space provided between the outer edge of said collar and the contiguous interior shoulder of the sleeve, peripheral ribs and groove on said enlarged end of the sleeve, bearing elevations on the sleeve with oil-seat between them, a hub-box loosely fitted upon the sleeve having terminal bush-seats, bushings seated therein whose outer edges project beyond their seats, the edge of the inner bushing bearing against the exterior shoulder of the sleeve and the edge of the outer bushing having contact with a flange on a tubular nut threaded to engage the terminal threads on the spindle as described.

4. In a hub-box a broad, inner, annular recess within its bush-seat, a bush in said seat inclosing said recess and forming an oil-chamber, an oil-supply tube through the box and hub and a duct connecting said chamber with an adjacent bearing as described.

5. In a vehicle-axle an oil-chamber formed by a broad annular groove within the box covered by the box-bushing, a supply-tube through the hub and box, a suitable cap for said tube, an oil-duct and wick therein connecting the oil-chamber with an adjacent bearing and a threaded gage to regulate the flow of oil substantially as described.

In testimony whereof I affix my signature in presence of two witnesses.

JAMES A. McLAUGHLIN.

Witnesses:
THOMAS J. STALEY,
FRANK P. TONES.